(12) United States Patent
Ueki (10) Patent No.: US 10,310,576 B2
(45) Date of Patent: Jun. 4, 2019

(54) POWER FEEDING SYSTEM AND POWER FEED CONTROL METHOD

(71) Applicant: Renesas Electronics Corporation, Koutou-ku, Tokyo (JP)

(72) Inventor: Takanori Ueki, Tokyo (JP)

(73) Assignee: Renesas Electronics Corporation, Tokyo ( * ) Notice: Subject to any disclaimer, the term of this patent is extended or adjusted under 35 U.S.C. 154(b) by 195 days.

(21) Appl. No.: 15/203,405

(22) Filed: Jul. 6, 2016

(65) Prior Publication Data

US 2017/0038810 A1 Feb. 9, 2017

(30) Foreign Application Priority Data

Aug. 7, 2015 (JP) .................................. 2015-156674

(51) Int. Cl.
*G06F 1/26* (2006.01)
*G06F 21/44* (2013.01)
(Continued)

(52) U.S. Cl.
CPC ............. *G06F 1/266* (2013.01); *G06F 21/44* (2013.01); *H02J 1/00* (2013.01); *H02J 7/0052* (2013.01);
(Continued)

(58) Field of Classification Search
CPC ....................................................... G06F 1/266
See application file for complete search history.

(56) References Cited

U.S. PATENT DOCUMENTS

2005/0001589 A1\* 1/2005 Edington .......... H01M 10/4257
320/128
2007/0143864 A1\* 6/2007 Cabana ................. H01M 10/42
726/36

(Continued)

FOREIGN PATENT DOCUMENTS

EP    2 034 423 A2    3/2009
JP    2011-215955 A   10/2011

OTHER PUBLICATIONS

Office Action dated Jan. 18, 2018 in European Patent Application No. 16 182 724.1.

(Continued)

*Primary Examiner* — Kim Huynh
*Assistant Examiner* — Joshua Neveln
(74) *Attorney, Agent, or Firm* — Shapiro, Gabor and Rosenberger, PLLC (57) ABSTRACT

The present invention ensures more secure connections between devices that comply with a USB power delivery standard. In an embodiment, a power feeding system 1 selects one of a plurality of power supply voltages and performs a power feeding operation via a USB interface, and the power feeding system includes: a USB cable 30 including a security controller 38 that holds security information, and a host 10 that is connected to the USB cable 30, includes an authenticator controller 14, the authenticator controller 14 authenticating the USB cable 30 using the security information received from the USB cable 30, receives a voltage selection signal that selects one of the plurality of power supply voltages, and performs a power feeding operation based on the voltage selection signal. The host 10 carries out the power feeding operation based on the voltage selection signal when the authentication has been successfully performed.

11 Claims, 8 Drawing Sheets

(51) Int. Cl.
*H02J 7/00* (2006.01)
*H02J 1/00* (2006.01)
(52) U.S. Cl.
CPC .............. *H02J 2007/0001* (2013.01); *H02J 2007/0062* (2013.01); *Y04S 40/24* (2013.01)

(56) References Cited

U.S. PATENT DOCUMENTS

| | | | |
|---|---|---|---|
| 2009/0061678 A1 | 3/2009 | Minoo et al. | |
| 2010/0173673 A1* | 7/2010 | Lydon | G06F 21/445 455/557 |
| 2011/0023111 A1* | 1/2011 | Gunadisastra | G06F 21/34 713/300 |
| 2011/0241434 A1 | 10/2011 | Yuasa et al. | |
| 2013/0080662 A1 | 3/2013 | Bourque | |
| 2014/0075210 A1 | 3/2014 | Rich et al. | |
| 2015/0137789 A1 | 5/2015 | Furtner | |
| 2015/0296619 A1* | 10/2015 | Rooyakkers | H05K 1/117 361/760 |
| 2015/0370299 A1* | 12/2015 | Waters | G06F 1/26 713/310 |

OTHER PUBLICATIONS

Universal Serial Bus Power Delivery Specification, Revision 2.0, Version 1.1 (May 7, 2015).
Universal Serial Bus Type-C Cable and Connector Specification, Revision 1.1 (Apr. 3, 2015).
Extended European Search Report dated Dec. 13, 2016, in European Patent Application No. 16182724.1.
Summons to attend oral proceedings issued Oct. 10, 2018, in European Patent Application No. 16182724.1.
Office Action dated Apr. 2, 2019, in Japanese Patent Application No. 2015-156674.

* cited by examiner

POWER FEEDING SYSTEM AND POWER FEED CONTROL METHOD

CROSS-REFERENCE TO RELATED APPLICATIONS

This application is based upon and claims the benefit of priority from Japanese patent application No. 2015-156674, filed on Aug. 7, 2015, the disclosure of which is incorporated herein in its entirety by reference.

BACKGROUND

The present invention relates to a power feeding system and a power feed control method and relates to, for example, a power feeding system and a power feed control method that select one of a plurality of power supply voltages set in a USBPD standard and perform a power feeding operation.

In recent years, many electronic devices such as personal computers, smartphones, and tablet terminals include a Universal Serial Bus (USB) interface. These electronic devices are able to perform data communications with other electronic devices via the USB interface and to receive power from the other electronic devices.

In accordance with the introduction of the USB power delivery (hereinafter it will be referred to as a USBPD) standard, a plurality of power supply voltages have been selectively supplied to one power supply line (Universal Serial Bus Power Delivery Specification Revision 2.0, Version 1.1 (May 7, 2015)). In the USBPD standard, the power feeding direction is not fixed and each component that constitutes a USBPD system such as a USB host, a USB hub, a battery charger, and a cable becomes a source-side device which supplies power via a power supply line (device that supplies the power supply voltage) or a sink-side device which receives power via the power supply line (device that receives the power supply voltage) depending on a communication partner.

The USBPD device selects, for example, one of power supply voltages of 5 V, 12 V, and 20 V depending on the communication partner and supplies the selected power supply voltage to the communication partner via the power supply line. Further, in the cable that connects the USBPD devices, a specification for mounting an ID chip is standardized (Universal Serial Bus Type-C Cable and Connector Specification Revision 1.1 (Apr. 3, 2015)). The ID chip stores specification information on the cable such as the current capacity, the performance thereof, and the vendor recognition information thereon. Such a cable is called an Electronically Marked Cable (E-marked cable).

The specification information on the cable is reported to the USBPD device from the ID chip mounted on the cable together with a Start Of Packet (SOP') packet, which indicates the start of the sequence. The SOP' packet is recognized by the source-side device of the USBPD device. Since the source-side device supplies the power supply voltage by referring to the current capacity of the cable based on the specification information on the cable, it is possible to avoid heating of the cable due to an overcurrent.

SUMMARY

However, information on the ID chip of the E-marked cable may be copied by disassembly and thus a cheap and inferior cable may be manufactured. If power that cannot be coped with by the inferior cable is supplied to this cable, the cable may be disconnected due to overheating. It is therefore required to ensure more secure connections.

The other problems of the related art and the novel characteristics of the present invention will be made apparent from the descriptions of the specification and the accompanying drawings.

According to one embodiment, in a power feeding system, a first security information on a first device is transmitted to a second device, the second device authenticates the first device using the first security information, and when the authentication has been successfully performed, the second device performs a power feeding operation based on a voltage selection signal that selects one of a plurality of power supply voltages set in a USBPD standard.

According to the embodiment, it is possible to ensure more secure connections between devices that comply with the USB power delivery standard.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, with reference to the drawings, embodiments of the present invention will be described. For the clarification of the description, the following description and the drawings may be omitted or simplified as appropriate. The specific numerical values and the like shown in the following embodiments are merely examples to facilitate understanding of the embodiments and are not limited thereto unless otherwise specified. Throughout the drawings, the same components are denoted by the same reference symbols and overlapping descriptions will be omitted as appropriate.

The embodiments relate to a power feeding system that complies with a USB power delivery (hereinafter it will be referred to as a USBPD) standard, performs a power delivery communication between a source-side device and a sink-side device, selects one of a plurality of power supply voltages set in the USBPD standard, and performs a power feeding operation. The power feeding system according to the embodiments transmits security information on a USB device to the source-side device via a setting line that performs a power delivery (hereinafter it will be referred to as a PD) communication to select one of the plurality of power supply voltages set in the USBPD standard. The source-side device authenticates the sink-side device using the security information and when the authentication has been successfully performed, supplies the power established in the PD communication to the USB device.

Before describing a power feeding system that authenticates the USB device connected thereto, with reference to FIGS. 8 to 11, a power feeding system 100 that complies with the USBPD standard will be described. The components of the power feeding system 100 comply with the USBPD standard. The components of the power feeding system 100 may include, for example, a USB host, a USB hub, a battery charger, and a cable. The USBPD device serves as a source-side device that supplies power via the power supply line (device that supplies the power supply voltage) or serves as a sink-side device that receives power via the power supply line (device that receives the power supply voltage) depending on a communication partner.

Figure 8:
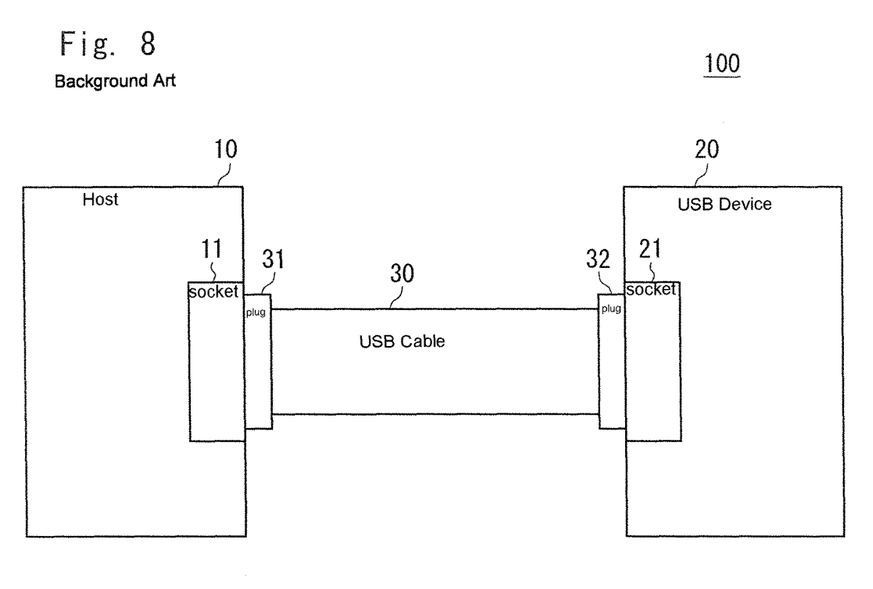
FIG. 8 is a diagram for describing a power feeding system according to embodiments.

In the example shown in FIG. 8, the power feeding system 100 includes a host 10, a USB device 20, and a USB cable 30. The host 10 includes a socket 11 and the USB device 20 includes a socket 21. Plugs 31 and 32 are provided in the respective ends of the USB cable 30. The plug 31 is inserted into the socket 11 and the plug 32 is inserted into the socket 21.

The host 10 is connected to the USB device 20 via the USB cable 30. The USB device 20 is able to perform data communications with the host 10 via the USB cable 30 and to receive power from the host 10. In the example shown in FIG. 8, the host 10 is the source-side device (device that supplies the power supply voltage) and the USB device 20 is the sink-side device (device that receives the power supply voltage).

Figure 9:
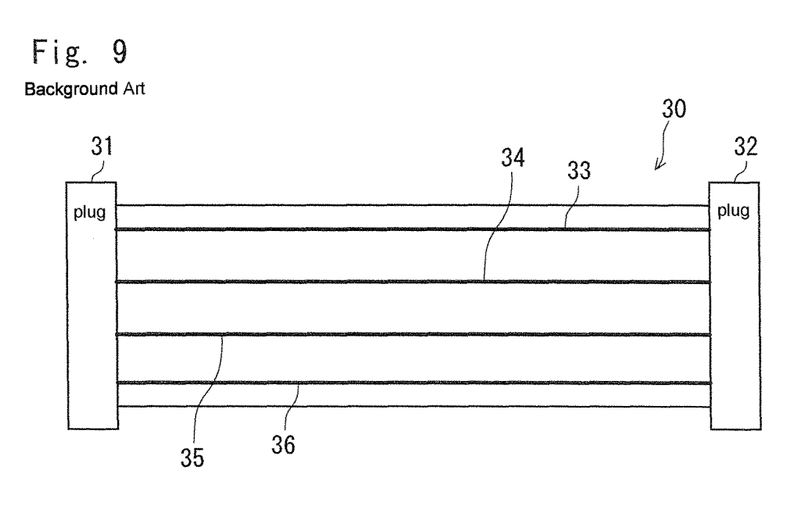
FIG. 9 is a diagram showing a configuration of lines in a cable used in the power feeding system shown in FIG. 8.
Figure 10:
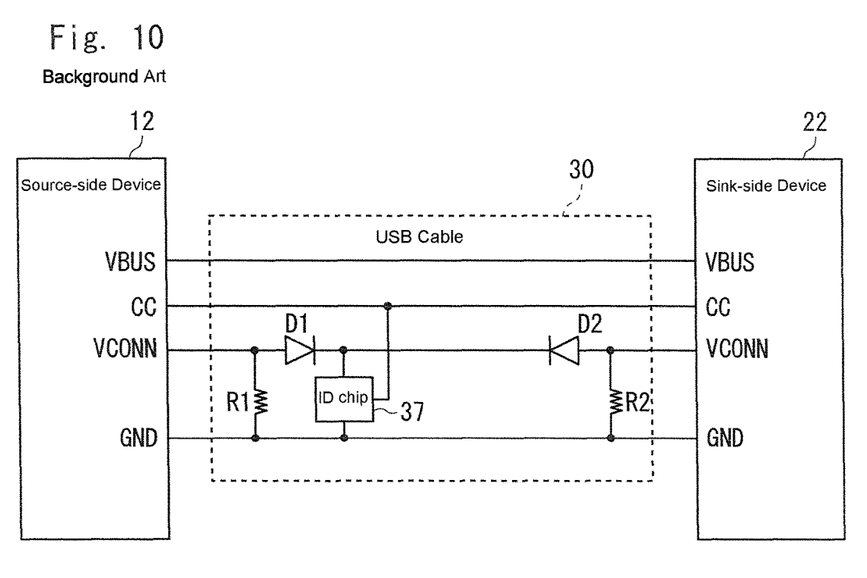
FIG. 10 is a diagram showing a configuration of the cable used in the power feeding system shown in FIG. 8.

FIGS. 9 and 10 are diagrams each showing a configuration of the cable used in the power feeding system shown in FIG. 8. The USB cable 30 is a USB Type-C cable. As shown in FIG. 9, the USB cable 30 includes a port configuration line 33, a power supply line 34, a data line 35, and a ground line 36.

The port configuration line 33 includes a configuration channel line CC (hereinafter it will be referred to as a CC line) shown in FIG. 10, which is one sideband signal line or a sideband signal line having one channel. The CC line is a setting line used to perform PD communications between the source-side device and the sink-side device.

The power supply line 34 includes one or more lines. In this example, as shown in FIG. 10, the power supply line 34 includes power supply lines VBUS and VCONN. One power supply voltage selected from a plurality of power supply voltages in a power supply voltage standard defined in the USBPD specification is supplied to the power supply line VBUS. That is, the plurality of power supply voltages are selectively supplied to the power supply line VBUS.

A power of 20 V and 5 A is supplied at maximum to the power supply line VBUS in accordance with a power negotiation between the host and the USB device defined in the USBPD specification. The host 10 selects, for example, one of the power supply voltages of 5 V, 12 V, and 20 V in accordance with a request from the USB device 20 connected to the host and supplies the selected power supply voltage to the USB device 20 via the power supply line VBUS. The host 10 is able to set the voltage in 50 mV steps within a range from 5 V to 20 V in view of the power supply voltage standard. The power supply line VCONN supplies power to an active circuit in the USB cable 30. The active circuit is supplied with, for example, power of 5 V and 210 mA via the power supply line VCONN.

The data line 35 includes two or more lines, and performs data communications between the host 10 and the USB device 20. The data line 35 is, for example, D+/D− for USB 2.0 communication or a pair of TX and RX for USB 3.1 communication. The ground line 36 includes one or more lines and includes a ground line GND shown in FIG. 10.

As shown in FIG. 10, a VBUS pin connected to the power supply line VBUS, a CC pin connected to the CC line, a VCONN pin connected to the power supply line VCONN, and a GND pin connected to the ground line GND are provided in each of the source-side device 12 and the sink-side device 22. The respective pins of the source-side device 12 and the sink-side device 22 are connected to each other via the respective lines of the USB cable 30.

An Electronically Marked Cable (E-marked cable) including specification information or the like of the cable is used as the USB cable 30. The USB cable 30 includes an ID chip 37. The ID chip 37 stores the specification information on the cable such as the current capacity that can be supported by the cable, the performance thereof, and vendor recognition information thereon. The ID chip 37 is connected to the power supply line VCONN and the ground line GND of the USB cable 30.

A diode D1 is provided between the ID chip 37 and the VCONN pin of the source-side device 12. The anode of the diode D1 is connected to the VCONN pin of the source-side device 12 and the cathode thereof is connected to the ID chip 37. The node between the VCONN pin of the source-side device 12 and the anode of the diode D1 is connected to the ground line GND via a resistor R1.

A diode D2 is provided between the ID chip 37 and the VCONN pin of the sink-side device 22. The anode of the diode D2 is connected to the VCONN pin of the sink-side device 22 and the cathode thereof is connected to the ID chip 37. The node between the VCONN pin of the sink-side device 22 and the anode of the diode D2 is connected to the ground line GND via a resistor R2.

The ID chip 37 receives power from one of the source-side device 12 and the sink-side device 22 via the power supply line VCONN. In this embodiment, the source-side device 12 supplies power to the power supply line VBUS and the power supply line VCONN. The ID chip 37 receives power via the power supply line VCONN. Further, the sink-side device 22 receives power via the power supply line VBUS.

While not shown in FIG. 10, the CC pin of the source-side device 12 is connected to a terminal resistor (pull-up resistor) that is connected to a power supply and the CC pin of the sink-side device 22 is connected to a terminal resistor (pull-down resistor) that is connected to the ground. The source-side device 12 monitors the voltage of the CC pin and detects a connection event. The source-side device 12 is able to detect whether the CC pin has been terminated at the terminal resistor on the side of the sink-side device 22. That is, the source-side device 12 monitors whether the voltage of the CC pin is smaller than a non-termination voltage. It is therefore possible to detect whether the sink-side device 22 has been connected to the source-side device 12.

Further, the ID chip 37 is connected to the CC line. The ID chip 37 is a notification unit that notifies the source-side device 12 of the current capacity of the USB cable 30 when power is fed. The specification information on the cable stored in the ID chip 37 is transmitted to the source-side device 12 via the CC line as a vendor defined message together with a Start Of Packet (SOP') packet indicating the start of the sequence.

The SOP' packet is recognized by the source-side device 12. The characteristics of the USB cable 30 are reported to the source-side device 12 as the vendor defined message. The source-side device 12 refers to the current capacity that can be supported by the USB cable 30 in accordance with the specification information on the cable and supplies the power determined in the PD communication with the sink-side device 22 to the sink-side device 22. It is therefore possible to avoid heating of the USB cable 30.

Figure 11:
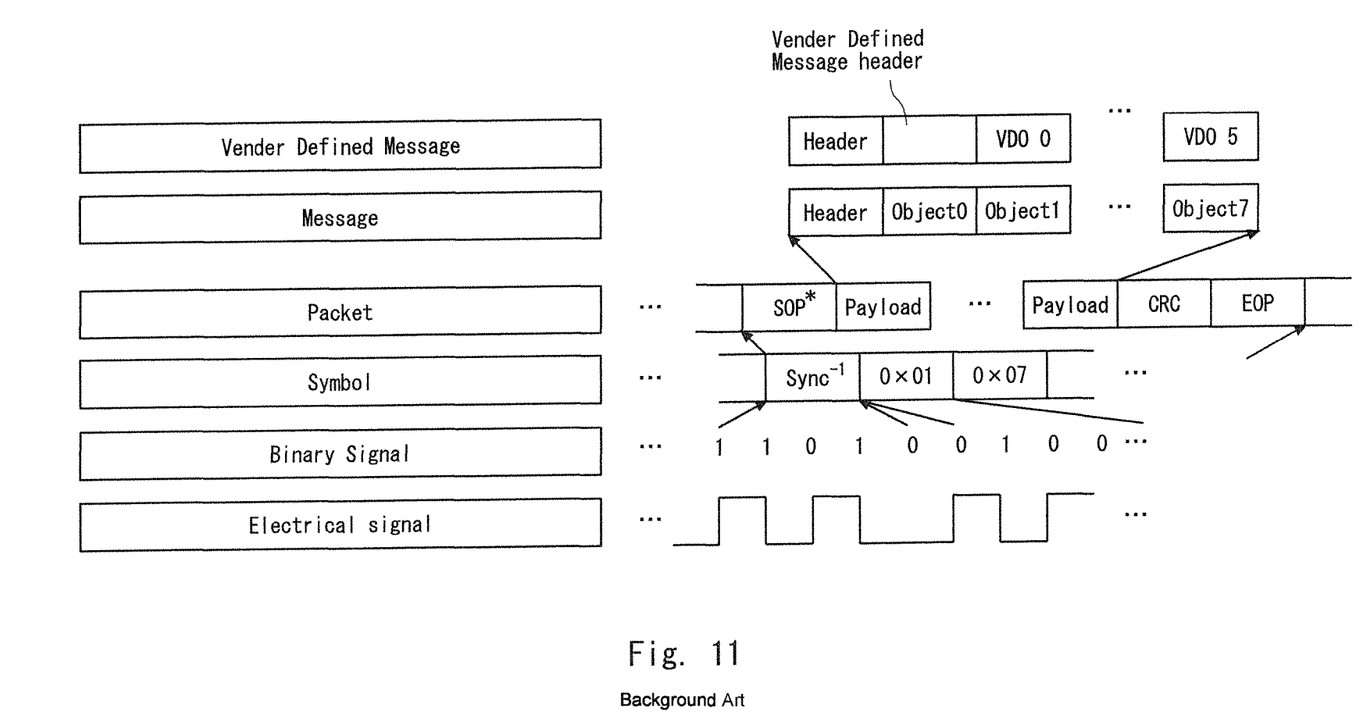
FIG. 11 is a diagram for describing a communication protocol on a port configuration line of the power feeding system shown in FIG. 8.

FIG. 11 is a diagram for describing a communication protocol on the CC line as the port configuration line 33 of the power feeding system 100 shown in FIG. 8. As shown in FIG. 11, in the power feeding system 100, the vendor defined message and a message are transmitted in serial on the CC line 33.

The vendor defined message enables the vendor to exchange information other than the information defined by the specification. In the aforementioned USB Type-C cable, besides the PD communication between the USBPD devices such as a USB host, a USB hub, a peripheral device, a battery charger, a cable, and an outlet that comply with the USBPD standard via the CC line, a USB data communication via a data line is performed.

By performing the PD communication by the new communication protocol using the vendor defined message, it is possible to expand the specification regarding vendor-specific power delivery. Further, in this embodiment, as will be described later, the security information on the USBPD device is transmitted via the CC line as the vendor defined message.

The communication protocols other than the vendor defined message are protocols that have been conventionally used. The vendor defined message and the message are each transmitted as an electrical signal. The electrical signal is expressed by a binary signal having two values. The binary signal is divided, for example, for every five bits and becomes one symbol.

The packet includes the vendor defined message or the message as a payload. Further, in the packet format of the USB power delivery communication, an SOP* packet is added to the top of the packet. The SOP* packet is one of an SOP packet, an SOP' packet, and an SOP'' packet.

The SOP packet is a code that specifies the start of the communication between the source-side device 12 and the sink-side device 22. The SOP' packet is a code that specifies the start of the communication between the source-side device 12 and the plug 31 of the USB cable 30. The SOP'' packet is a code that specifies the start of the communication between the source-side device 12 and the plug 32 of the USB cable 30. The response to the SOP'' packet by the plug 32 is an option and the SOP'' packet may not be added.

As described above, when the specification information on the USB cable 30 is transmitted as the vendor defined message, the SOP' packet is added to the vendor defined message. At the last part of the frame of the packet, Cyclic Redundancy Check (CRC) for an error detection and End Of Packet (EOP), which indicates the end of the packet, are transmitted. The message includes, for example, 16-bit headers and 32-bit objects (Object 0 to Object 7). Further, the vendor defined message includes, for example, a header, a vendor defined message header, and vendor defined objects (VDO 0 to VDO 5).

As described above, the USBPD device refers to the current capacity of the cable based on the specification information on the cable and supplies power. When the information on the ID chip of the cable is copied by disassembly or the like, however, even when the cable does not actually have a sufficient capacity, the cable may appear as if it has the sufficient current capacity, and power that exceeds the current capacity may be supplied to the cable.

In view of the above discussion, in the first to third embodiments described below, a security infrastructure is implemented in the power feeding system formed of the USBPD device in order to ensure more secure connections between devices that comply with the USBPD standard. The security information on the USBPD device that constitutes the power feeding system is transmitted as the vendor defined message.

First Embodiment

Figure 1:
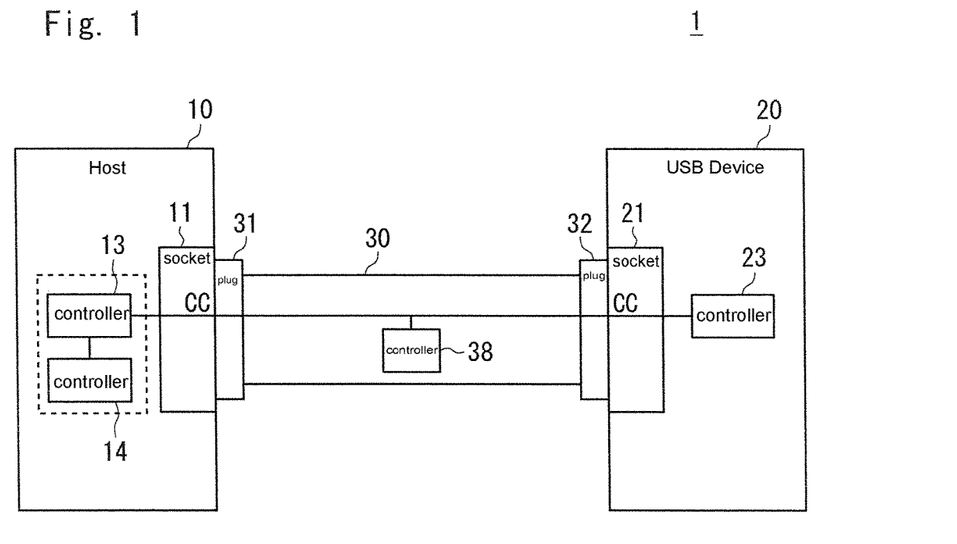
FIG. 1 is a diagram showing a configuration of a power feeding system according to a first embodiment.
Figure 2:
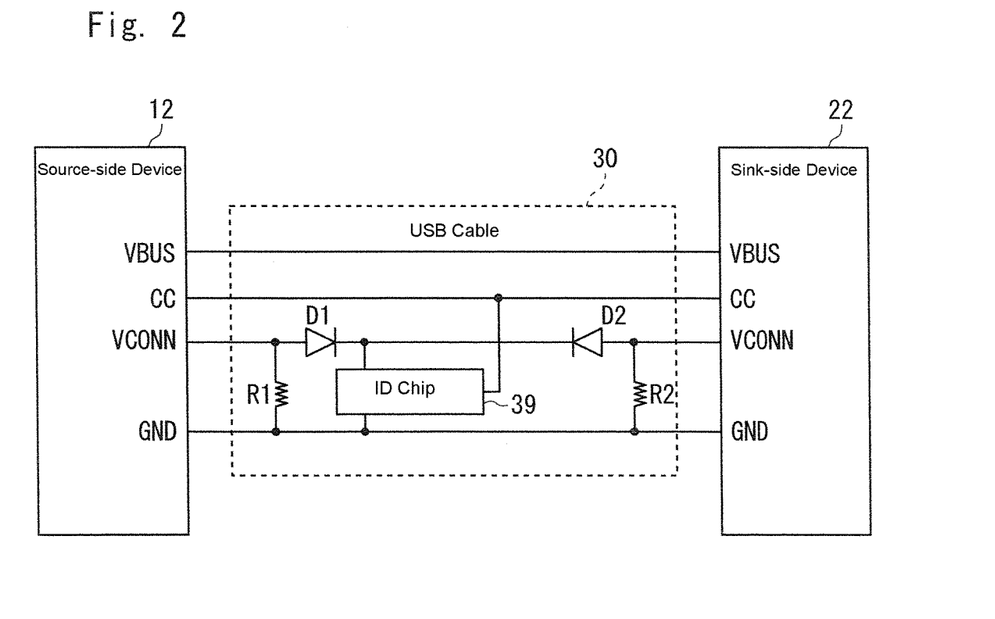
FIG. 2 is a diagram showing a configuration of a cable used in the power feeding system shown in FIG. 1.

With reference to FIGS. 1 and 2, a power feeding system 1 according to a first embodiment will be described. FIG. 1 is a diagram showing a configuration of the power feeding system 1 according to the first embodiment. FIG. 2 is a diagram showing a configuration of a USB cable 30 used in the power feeding system 1 shown in FIG. 1.

As shown in FIG. 1, the power feeding system 1 includes a host 10, a USB device 20, and a USB cable 30. In the power feeding system 1 according to the first embodiment, the USB device 20 receives power from the host 10 via the USB cable 30. That is, the host 10 is the source-side device and the USB device 20 is the sink-side device. The power feeding system 1 is an example in which the USB cable 30 is authenticated by the host 10. Accordingly, in the example shown in FIG. 1, the host 10 is an authentication device and the USB cable 30 is a protection device that is authenticated by the host 10.

The host 10 includes a socket 11, a USBPD controller 13, and an authenticator controller 14. The USBPD controller 13 and the authenticator controller 14 may be formed in one chip or may be formed in separate chips. The USB device 20 includes a socket 21 and a USBPD controller 23. The USB cable 30 includes plugs 31 and 32 and a security controller 38. The authenticator controller 14 is provided in the host 10, which is the source-side device, and the security controller 38 is provided in the USB cable 30 that constitutes the power delivery system.

The USBPD controller 13 and the USBPD controller 23 are connected to each other via the CC line of the USB cable 30. The USBPD controller 13 and the USBPD controller 23 perform the PD communication to set the power supplied from the host 10 using the CC line. Further, the security controller 38 is connected to the CC line in the USB cable 30.

As shown in FIG. 2, the USB cable 30 is an E-marked cable and includes an ID chip 39 that stores the specification information on the USB cable 30. The security controller 38 is provided in the ID chip 39. Since a connection of the ID chip 39 is similar to that of the ID chip 37 shown in FIG. 10, a detailed description thereof will be omitted. The specification information on the USB cable 30 stored in the ID chip 39 is transmitted to the source-side device 12 via the CC line. The source-side device 12 refers to the current capacity that can be supported by the cable based on the specification information on the USB cable 30 and sets the current value of the power to be supplied.

Further, the USBPD controller 13 provided in the source-side device receives a voltage selection signal to select one of the plurality of power supply voltages set in the USBPD standard via the CC line from the USBPD controller 23, which is the sink-side device. The host 10, which is the source-side device, selects one of the plurality of power supply voltages based on the voltage selection signal and outputs the voltage that has been selected via the power supply line VBUS. The host 10, which is the source-side device, sends the voltage that has been set based on the specification information on the USB cable 30 and the voltage selection signal to the USB cable 30. The specification information on the USB cable 30 and the voltage selection signal are included in the PD communication. That is, the USBPD controller 13, the USBPD controller 23, and the ID chip 39 perform the PD communication that determines the power to be supplied to the USB device 20 from the host 10.

The host 10 supplies, when the authenticator controller 14 has successfully authenticated the USB cable 30, the power established in the PD communication to the USB device 20 via the USB cable 30. It is therefore possible to ensure more secure connections between the USBPD devices in the power feeding system 1 that complies with the USBPD standard. The authentication process of the USB cable 30 by the authenticator controller 14 will be described later.

Figure 3:
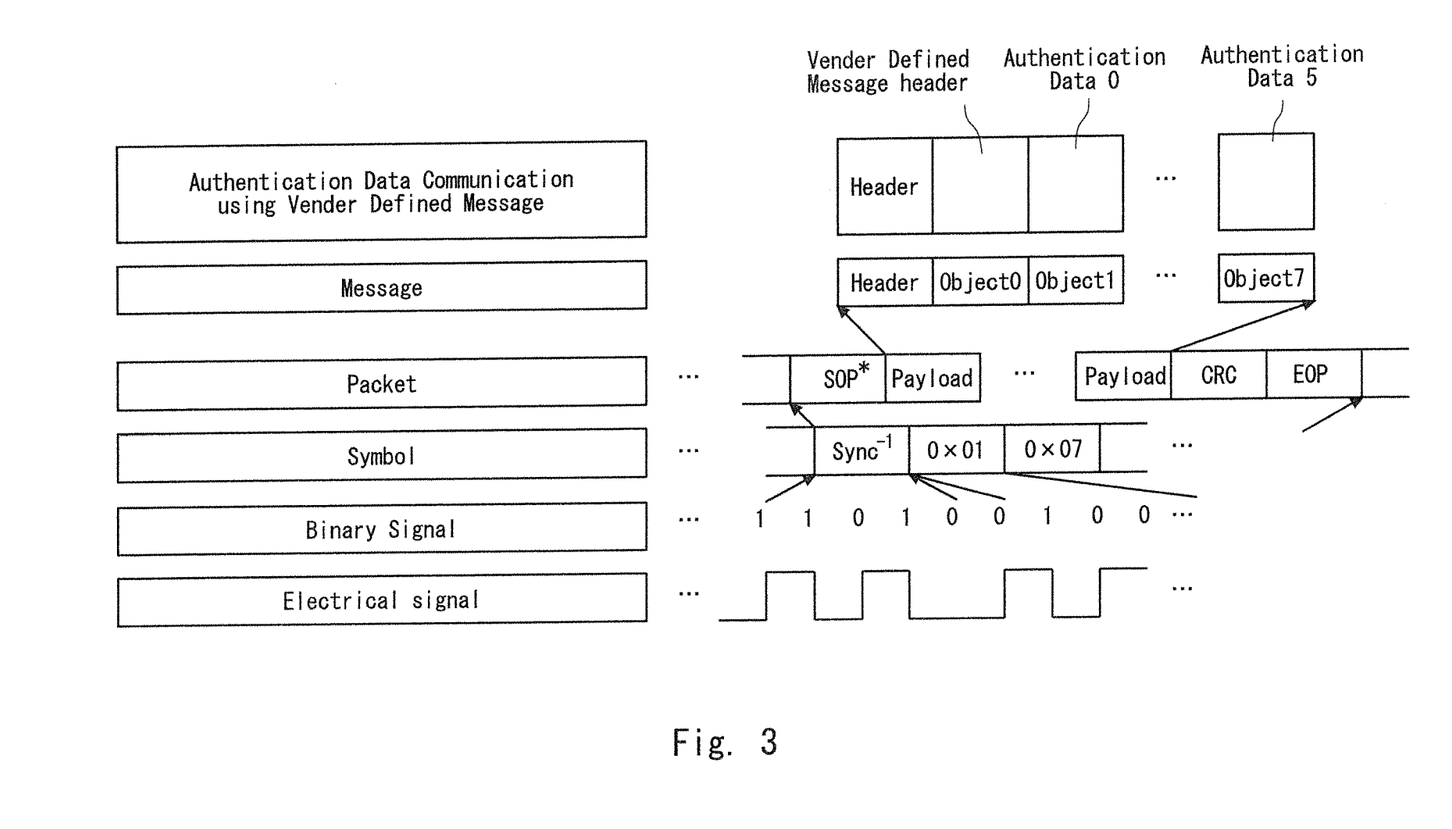
FIG. 3 is a diagram for describing a communication protocol on a port configuration line of the power feeding system shown in FIG. 1.

FIG. 3 is a diagram for describing a communication protocol on a port configuration line of the power feeding system 1. As shown in FIG. 3, in the power feeding system 1, an authentication data communication is carried out using the vendor defined message. The security information (Authentication Data 0 to Authentication Data 5) of the USB cable 30 is transmitted to the host 10 via the CC line as the vendor defined message.

Figure 4:
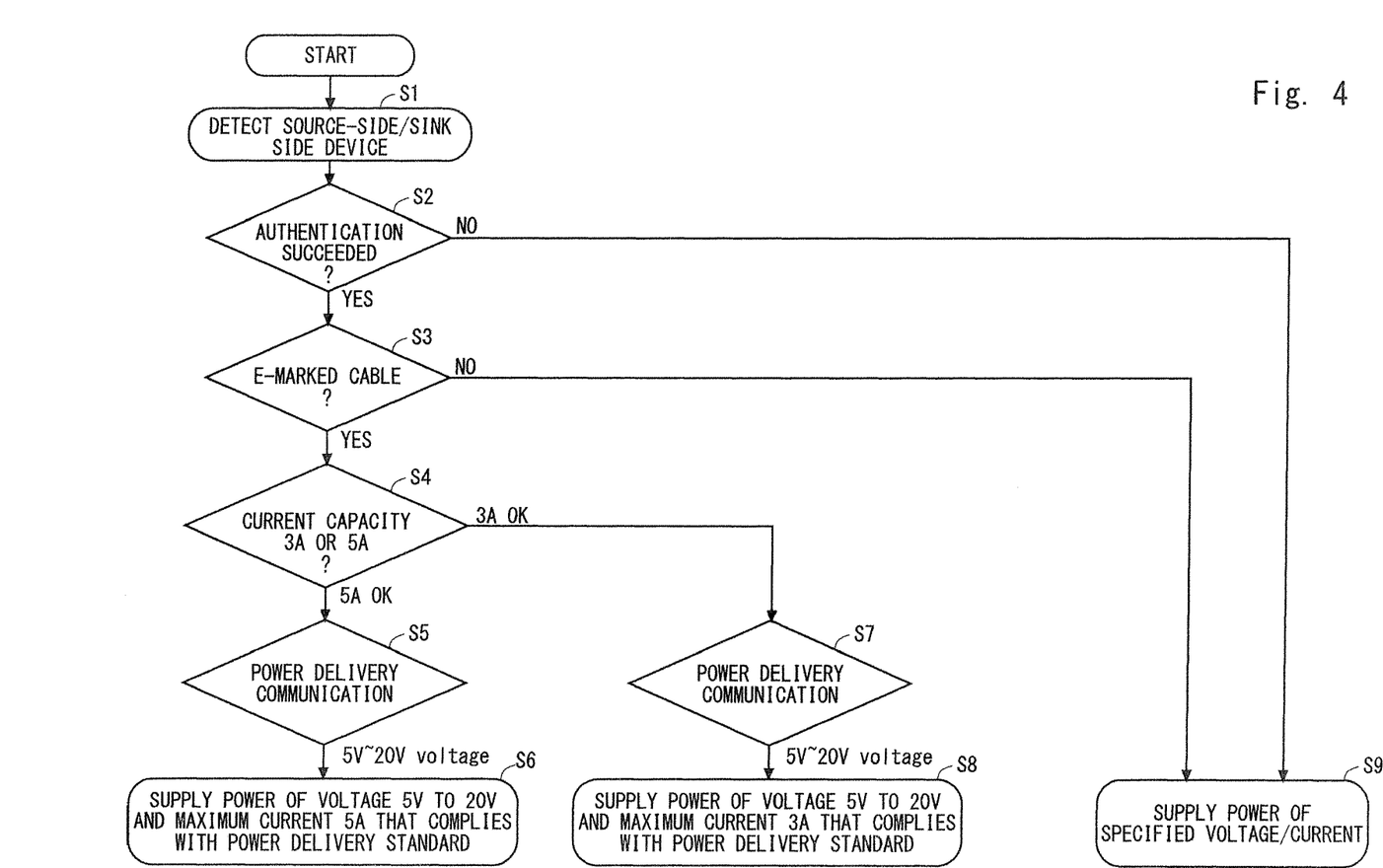
FIG. 4 is a flowchart for describing a power feed control method according to the first embodiment.
Figure 5:
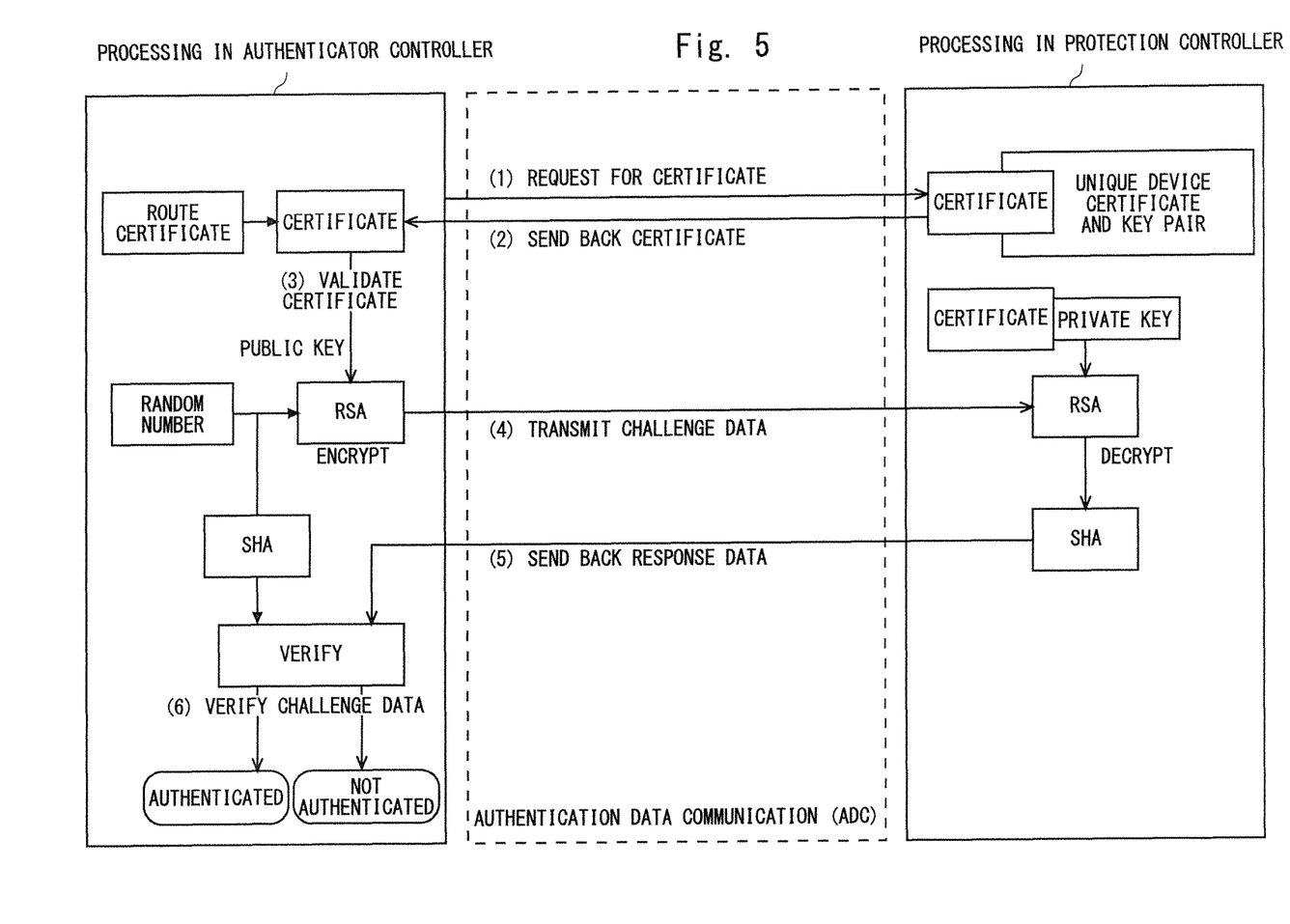
FIG. 5 is a diagram for describing an authentication process in Step S2 of FIG. 4.

With reference to FIGS. 4 and 5, a power feed control method according to the first embodiment will be described. FIG. 4 is a flowchart for describing the power feed control method according to the first embodiment. FIG. 5 is a diagram for describing the authentication process in Step S2 of FIG. 4.

When the host 10 and the USB device 20 are connected to each other by the USB cable 30, first, as shown in FIG. 4, the source-side device and the sink-side device are detected (Step S1). When the USB cable 30 is inserted into the socket 11 of the host 10 and the socket 21 of the USB device 20, a voltage value divided by a pull-up resistor or a pull-down resistor embedded in the host 10 and the USB device 20 appears in the CC pin. By monitoring this voltage value, the source-side device and the sink-side device can be detected. In the first embodiment, the host 10 is the source-side device and the USB device 20 is the sink-side device.

After that, the security information on the USB cable 30 is transmitted to the authenticator controller 14 from the security controller 38. The authentication of the USB cable 30 using this security information is then performed (Step S2). In the power feeding system 1 according to the first embodiment, a public key infrastructure (PKI) is used as one example of the security infrastructure. The public key infrastructure is one of the methods to establish the reliability of a pair of the USB devices. In this example, the host 10 and the USB cable 30 are the pair in which the reliability is to be established.

As shown in FIG. 5, in Step S2 of FIG. 4, an authentication process using a public key encryption system is executed. In the public key encryption system, information is encrypted and decrypted using a key pair comprised of a private key and a public key. The left side of FIG. 5 shows processing in the authenticator controller 14 of the host 10 and the right side of FIG. 5 shows processing in the security controller 38 of the USB cable 30. An authentication data communication (ADC) performed between the host 10 and the USB cable 30 is shown in FIG. 5 between the processing in the host 10 and the processing in the USB cable 30. The authenticator controller 14 and the security controller 38 are electrically connected to each other via the CC line and can exchange digital information during the authentication process.

The security controller 38 stores a unique device certificate and the key pair comprised of the private key and the public key. The private key of the security controller 38 is secretly managed by the USB cable 30, which is the owner of the private key. The public key of the security controller 38 is distributed to the host 10, which is the communication partner. In the authentication process, first, (1) the authenticator controller 14 requests the security controller 38 for the certificate.

After that, in response to the request from the authenticator controller 14, (2) the certificate is sent back to the authenticator controller 14. In the first embodiment, the device certificate including the public key is sent back as the certificate. The device certificate is an identification information to determine the public key used to authenticate the USB cable 30. The host 10 may store a public key list of the USBPD devices connected to the host 10, and the public key of the USBPD device connected to the host 10 may be selected from the public key list according to the device certificate that is transmitted.

The host 10 includes a route certificate issued by the certificate authority (CA). (3) The host 10 then validates the certificate from the USB cable 30 using the route certificate. The host 10 then encrypts the random number using the public key included in the certificate. In this example, the host 10 encrypts the random number using the public key by an RSA encryption system, which is one of the public key encryption systems, and generates challenge data. This challenge data is data to certify the USB cable 30 having the true private key associated with the device certificate. (4) This challenge data is then transmitted to the security controller 38. Further, the authenticator controller 14 encrypts the challenge data and generates a digest using SHA, which is one of the hash functions.

The security controller 38 decrypts the challenge data using the private key that the security controller 38 holds, generates a digest using SHA, which is one of the hash functions, and (5) then sends back the digest as response data. The authenticator controller 14 compares the digest generated by the authenticator controller 14 with the response data that the authenticator controller 14 has received and (6) then performs verification of the challenge data. When the digest generated by the authenticator controller 14 coincides with the response data that the authenticator controller 14 has received, the USB cable 30 is authenticated since the function and the quality of the USB cable 30 are reliable. On the other hand, when the digest generated by the authenticator controller 14 does not coincide with the response data that the authenticator controller 14 has received, the USB cable 30 is not authenticated since it is not reliable. As stated above, in the first embodiment, the host 10 is able to authenticate the USB cable 30 in the challenge and response system.

When the authentication has failed in Step S2 in FIG. 4 (NO), the USB cable that has been connected is an unauthenticated USBPD device such as a forged USB cable. In this case, power of a specified voltage/current defined in the specification of the USBPD standard is supplied to the sink device via the USB cable (Step S9). The host 10 supplies, for example, power with the voltage 5 V/current 500 mA to the USB cable 30.

On the other hand, when the authentication has been successfully performed in Step S2 (YES), the USB cable that has been connected to the host 10 is a reliable USBPD device. After that, it is determined whether the USB cable 30 is an E-marked cable (Step S3).

In Step S3, when the USB cable connected to the host 10 is not the E-marked cable (NO), the USB cable does not correspond to the rated current of 3 A/5 A supported by the E-marked cable. In this case, power of the specified voltage/current defined in the specification of the USBPD standard is supplied to the sink device via the USB cable (Step S9).

In Step S3, when the USB cable connected to the host 10 is the E-marked cable (YES), it is determined whether the current capacity of the USB cable 30 is 3 A or 5 A (Step S4). In Step S4, when the current capacity of the USB cable 30 is 5 A, the process goes to Step S5 and when the current capacity of the USB cable 30 is 3 A, the process goes to Step S7.

In Step S5, the power delivery communication is performed and power of the power supply voltage (5 V to 20 V) and the maximum current 5 A according to the result of the power delivery communication is supplied (Step S6). In a similar way, in Step S7, power of the power supply voltage (5 V to 20 V) and the maximum current 3 A according to the result of the power delivery communication is supplied (Step S8). As described above, when the USB cable 30 has been successfully authenticated, the power of the current/voltage established in the PD communication between the USBPD controller 13 and the USBPD controller 23 is supplied to the USB device 20.

As described above, in the power feeding system 1 according to the first embodiment, the voltage established in the PD communication is sent to the USB cable 30 only when the USB cable 30 has been successfully authenticated. The USB cable 30 that has been authenticated is able to cope with the range of the power defined by the USBPD standard (e.g., 10 W to 100 W), with the current capacity of the USB cable as the upper limit. Therefore, even when a high power of 20 V/5 A is selected in the PD communication, power can be safely supplied to the USB device 20 without the occurrence of a disconnection of the USB cable 30 due to overheating.

While the example in which the host 10 is the source-side device and the USB device 20 is the sink-side device has been shown above, the present invention is not limited to this example. For example, the host, the hub, the battery charger, the outlet or the like may be the source-side device. Further, the peripheral device, the hub or the like may be the sink-side device. The sink-side device and the cable may include the security controller that stores the unique device certificate and the key pair and the source-side device may include the authenticator controller. The sink-side device and the cable including the security controller are authenticated by the authenticator controller provided in the source-side device.

In general, after the communication is performed between power delivery controllers mounted on both the source-side device and the sink-side device, the current/voltage supplied from the source device is determined based on the voltage selection signal transmitted from the sink-side device without authenticating the sink-side device, and the current/voltage is supplied to the sink device. It is therefore impossible to know whether the cable specification information held by the cable is reliable and it is thus impossible to know whether the cable definitely corresponds to power established in the PD communication by the sink-side device. On the other hand, in the first embodiment, when the source-side device has successfully authenticated the cable, the power established in the PD communication is supplied based on the reliable cable specification information. Thus, according to the first embodiment, it is possible to execute power feeding between devices that comply with the USBPD standard more securely.

In the example shown in FIG. 1, the host 10, which is the source-side device, is provided with the authenticator controller and the source-side device authenticates the USB cable. The authenticator controller may not be provided in the source-side device and it may instead be provided in the USB device 20, which is the sink-side device, and the sink-side device may authenticate the USB cable.

Second Embodiment

Figure 6:
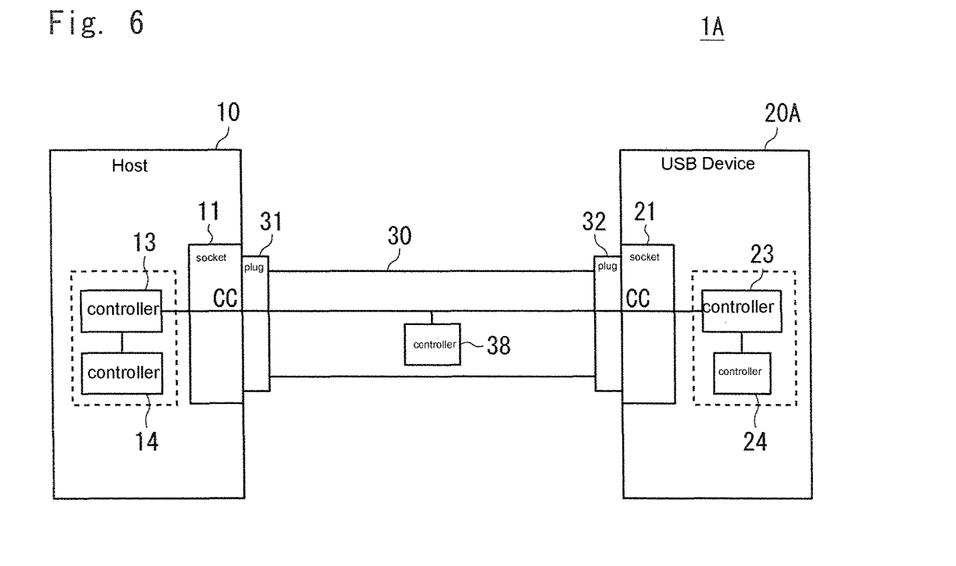
FIG. 6 is a diagram showing a configuration of a power feeding system according to a second embodiment.

With reference to FIG. 6, a power feeding system 1A according to a second embodiment will be described. FIG. 6 is a diagram showing a configuration of the power feeding system 1A according to the second embodiment. The power feeding system 1A includes a host 10, a USB device 20A, and a USB cable 30. The second embodiment is different from the first embodiment in that a security controller 24 is provided in the USB device 20A in the second embodiment.

In the first embodiment, the protection device on which the security controller 38 is mounted is only the USB cable 30. On the other hand, in the second embodiment, the security controller 24 is provided also in the USB device 20A connected to the host 10, which is the authentication device, via the USB cable 30. That is, the power feeding system 1A includes two protection devices. The USBPD controller 23 and the security controller 24 may be formed in one chip or may be formed in separate chips.

The security controller 24 holds security information on the USB device 20A. In the second embodiment, the security information on the USB cable 30 and the security information on the USB device 20A are transmitted in serial to the authenticator controller 14 via the CC line as the vendor defined message. After the authenticator controller 14 authenticates the USB cable 30 using the security information, the authenticator controller 14 authenticates the USB device 20A.

The host 10 supplies, when the authenticator controller 14 has successfully authenticated the USB cable 30 and the USB device 20A, the power established in the PD communication to the USB device 20A via the USB cable 30. It is therefore possible to ensure more secure connections between the USBPD devices in the power feeding system 1 that complies with the USBPD standard.

Similar to the authentication process of the USB cable 30 described in the first embodiment, the public key encryption system is used also in the authentication process of the USB device 20A. The unique device certificate and the key pair including the private key and the public key are stored in the security controller 24. The private key of the security controller 24 is secretly managed by the USB device 20A, which is the owner of the private key. The public key of the security controller 24 is distributed to the host 10, which is the connection partner.

In the second embodiment, similar to the authentication process described with reference to FIG. 5, the host 10 is able to authenticate the USB cable 30 and the USB device 20A in the challenge and response system. As described above, by authenticating both the USB cable 30 and the USB device 20A, it is possible to establish connections with a higher reliability and to further enhance the safety level of the power feeding.

While the host 10 including the authenticator controller 14 is the source-side device and the USB device 20A is the sink-side device in the example shown in FIG. 6, the sink-side device (host 10) including the authenticator controller 14 may authenticate the source-side device (USB device 20A) when the power feeding direction is reversed and thus the USB device 20A becomes the source-side device and the host 10 becomes the sink-side device.

Further, while the example in which the authenticator controller 14 is provided only in the host 10 is shown in FIG. 6, the host 10 may include the security controller in place of the authenticator controller 14 and the authenticator controller may be provided in the USB device 20A. In this case, the USB device 20A, which is the sink-side device, may authenticate the USB cable and the host 10, which is the source-side device.

Further, while there are two protection devices, the USB cable 30 and the USB device 20A in the example shown in FIG. 6, there may be more than two. Further, the two protection devices (the USB cable 30 and the USB device 20A) may be authenticated either in serial (the USB device 20A may be authenticated after the cable is authenticated) or in parallel (the USB cable 30 and the USB device 20A may be concurrently authenticated).

Third Embodiment

Figure 7:
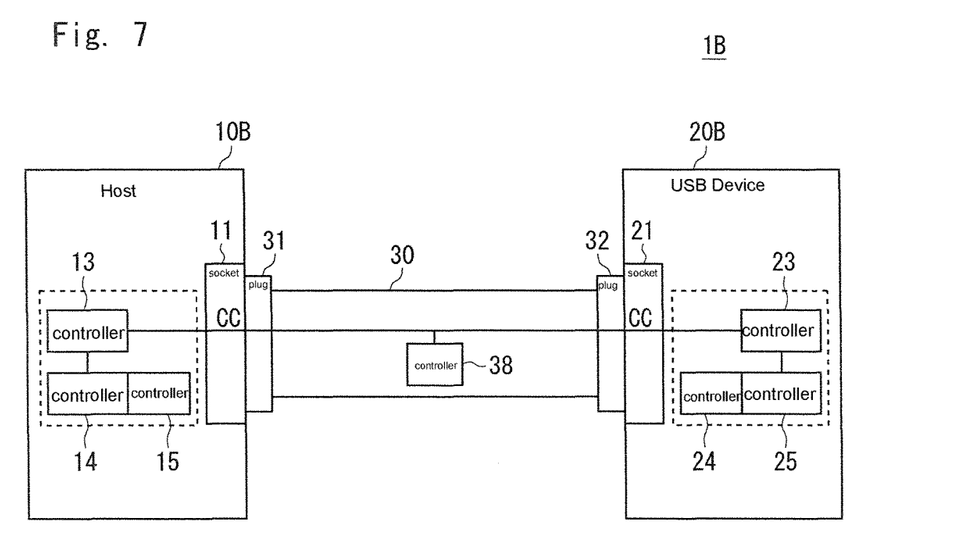
FIG. 7 is a diagram showing a configuration of a power feeding system according to a third embodiment.

With reference to FIG. 7, a power feeding system 1B according to a third embodiment will be described. FIG. 7 is a diagram showing a configuration of the power feeding system 1B according to the third embodiment. As shown in FIG. 7, the power feeding system 1B includes a host 10B, a USB device 20B, and a USB cable 30.

The host 10B includes an authenticator controller 14 and a security controller 15. The USB device 20B includes a security controller 24 and an authenticator controller 25. In the third embodiment, both the host 10B and the USB device 20B can be the authentication device or the protection device.

That is, the power feeding system 1B may have either a first state in which the host 10B is the source-side device and the USB device 20B is the sink-side device or a second state in which the host 10B is the sink-side device and the USB device 20B is the source-side device. In the first state, the host 10B authenticates the USB device 20B. On the other hand, in the second state, the USB device 20B authenticates the host 10B.

The security controller 15 holds security information on the host 10B. When the USB device 20B authenticates the host 10B, the security information on the USB cable 30 and the security information on the host 10B are transmitted in serial to the security controller 24 via the CC line as the vendor defined message. After the authenticator controller 25 authenticates the USB cable 30 using the security information, the host 10B is authenticated.

When the USB cable 30 and the host 10B are successively authenticated by the authenticator controller 25, the USB device 20B supplies the power established in the PD communication to the host 10B via the USB cable 30. As described above, in the power feeding system 1B, a mutual authentication between the USBPD devices can be achieved, whereby it is possible to establish connections with higher reliability and to further enhance the safety level of the power feeding.

In the third embodiment, it is determined which one of the host 10B and the USB device 20B is the source-side device or the sink-side device when the host 10B and the USB device 20B are connected to each other. In the third embodiment, the host 10B is the source-side device and the USB device 20B is the sink-side device.

The USBPD device, which is the source-side device, is the authentication device. In the example shown in FIG. 7, the host 10B, which is the source-side device, becomes the authentication device and the USB device 20B, which is the sink-side device, becomes the protection device. In this case, the power feeding system 1B is in the first state and the host 10B authenticates the USB device 20B. Regarding the authentication process, a method similar to that in the first embodiment may be employed.

As described above, according to the third embodiment, the USBPD devices that form the power feeding system can be switched between the authentication device and the protection device depending on the communication partner. The USBPD device that forms the power feeding system is therefore able to flexibly perform authentication depending on the communication partner.

While the example in which the host 10B and the USB device 20B are connected to each other has been shown in FIG. 7, the present invention is not limited to this example. For example, the USB host, the USB hub, the battery charger, the outlet or the like may become the source-side device. Further, the peripheral device, the USB hub or the like may become the sink-side device. Each of the source-side device, the sink-side device, and the cable can include both the authenticator controller and the security controller.

The authentication method is not limited to the public key encryption system described above and another authentication method based on encryption may be employed. A common key encryption system, a hybrid encryption system or the like may be employed, for example, in place of the public key encryption system described above.

Further, while the example in which the USBPD devices are connected using the USB cable has been described in the above embodiments, the USB terminals of the USBPD devices may be directly connected. In this case, both the USBPD devices may include the authenticator controller and the security controller. When one of the source-side device and the sink-side device performs authentication of the other one of the source-side device and the sink-side device and the authentication has been successfully performed, the power established in the PD communication may be supplied to the sink-side device from the source-side device.

Further, while the example in which the source-side device authenticates the USB cable and the sink-side device has been described in the above embodiments, after the sink-side device authenticates the USB cable and the source-side device, the source-side device may supply the power established in the PD communication to the sink-side device via the USB cable. Alternatively, after the source-side device authenticates the USB cable and the sink-side device, the sink-side device may authenticate the source-side device.

Further, the security controller may hold revocation information that invalidates the security information in case that the security information is leaked. By transmitting the revocation information to the authenticator controller, it is possible to prevent the authenticator controller from authenticating the USBPD device including the revocation information. According to this configuration, even when the security information that has been leaked is illegally copied and an inferior imitation device is manufactured, the power established in the PD communication is not supplied to this imitation device. It is therefore possible to further improve the security level of the connection of the USBPD device.

The power feed control method according to the embodiments may be expressed as shown in the following Supplementary Notes.

(Supplementary Note 1)

A power feed control method that selects one of a plurality of power supply voltages and performs a power feeding operation via a USB interface, the power feed control method comprising:

transmitting a first security information on a first device to a second device;

authenticating the first device using the first security information in the second device; and feeding, when the authentication has been successfully performed, power from the second device to the first device based on a voltage selection signal that selects one of the plurality of power supply voltages.

(Supplementary Note 2)

The power feed control method according to Supplementary Note 1, wherein:

the first device is a cable that notifies the second device of a current capacity during the power feeding operation, and the second device refers to the current capacity and feeds power based on the voltage selection signal.

(Supplementary Note 3)

The power feed control method according to Supplementary Note 2, wherein:

the second device and a third device that is connected to the second device via the cable perform a power delivery communication including a supply of the voltage selection signal via a setting line, and the second device refers to the current capacity and supplies power to the third device.

(Supplementary Note 4)

The power feed control method according to Supplementary Note 3, comprising:

transmitting a second security information on a third device to the second device via the setting line;

authenticating, by the second device, the third device using the second security information; and supplying, when the cable and the third device have been successfully authenticated, power established in the power delivery communication from the second device to the third device via the cable.

(Supplementary Note 5)

The power feed control method according to Supplementary Note 4, comprising:

transmitting a third security information on the second device to the third device via the setting line;

authenticating, by the third device, the cable using the first security information received via the setting line and authenticating the second device using the third security information; and supplying, when the cable and the second device have been successfully authenticated, power established in the power delivery communication from the third device to the second device via the cable.

(Supplementary Note 6)

The power feed control method according to Supplementary Note 5, comprising:

determining, when the second device and the third device are connected to each other, which one of the second device and the third device is a device that supplies the power supply voltage and a device that receives the power supply voltage; and authenticating, by the device that supplies the power supply voltage, the device that receives the power supply voltage and supplying, when the authentication has been successfully performed, power established in the power delivery communication to the device that receives the power supply voltage.

(Supplementary Note 7)

The power feed control method according to Supplementary Note 1, wherein:

the first security information is a key pair including a public key and a private key in a public key authentication system, and the second device authenticates the first device by a challenge and response system using the public key.

(Supplementary Note 8)

The power feed control method according to Supplementary Note 1, wherein, when the authentication has failed, a predetermined power supply voltage is supplied to the first device from the second device.

While the invention made by the present inventors has been specifically described based on the embodiments, it is needless to say that the present invention is not limited to the embodiments stated above and may be changed in various ways without departing from the spirit of the present invention.

The above embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A power feeding system that selects one of a plurality of power supply voltages and performs a power feeding operation via a USB interface, the power feeding system comprising:

a USB cable comprising a first controller that holds a first security information;

a host device that is connected to the USB cable and includes a second controller; and a USB device connected to the host device via the USB cable, wherein the second controller authenticates the USB cable using the first security information received from the USB cable, receives a voltage selection signal that selects one of the plurality of power supply voltages, and performs a power feeding operation based on the voltage selection signal, wherein when the authentication of the USB cable is successful, the host device further determines whether the USB cable is a cable that stores information thereon, wherein when the authentication of the USB cable is successful and a determination is made that the USB cable is a cable that stores information thereon, the host device carries out the power feeding operation based on the voltage selection signal, wherein when the authentication fails or when it is determined that the USB cable is not a cable that stores information thereon, the host device supplies a predetermined power supply voltage to the USB cable, wherein the USB cable comprises a notification unit, the notification unit notifying the host device of a current capacity during the power feeding operation, wherein the host device refers to the current capacity and performs the power feeding operation based on the voltage selection signal, wherein the host device and the USB device perform a power delivery communication including a supply of the voltage selection signal via a setting line, wherein the host device refers to the current capacity and supplies power to the USB device, wherein the USB device comprises a third controller that holds a second security information, wherein the second controller authenticates the USB device using the second security information received via the setting line, and wherein the host device supplies, when authentication of the USB cable and the USB device has been successful, power established in the power delivery communication to the USB device via the USB cable.

2. The power feeding system according to claim 1, wherein the first controller is provided in the notification unit.

3. The power feeding system according to claim 1, wherein:
the second controller holds a third security information,
the third controller authenticates the USB cable using the first security information received via the setting line and authenticates the host device using the third security information received via the setting line, and
the USB device supplies, when authentication of the USB cable and the host device has been successful, power established in the power delivery communication to the host device via the USB cable.

4. The power feeding system according to claim 1, wherein:
the first controller holds a key pair including a public key and a private key in a public key authentication system as the first security information, and
the second controller authenticates the USB cable by a challenge and response system using the public key received from the first controller.

5. The power feeding system of claim 1, wherein the predetermined power supply voltage is 5V at 500 mA current.

6. A power feeding system that selects one of a plurality of power supply voltages and performs a power feeding operation via a USB interface, the power feeding system comprising:
a USB cable including a setting line that performs a power delivery communication to select one of the power supply voltages;
a host device that is connected to the setting line and includes a first controller that holds a first security information;
a USB device that is connected to the setting line and includes a second controller that holds a second security information;
a first authentication unit that is provided in the host device and authenticates the USB device using the second security information received via the setting line; and
a second authentication unit that is provided in the USB device and authenticates the host device using the first security information received via the setting line,
wherein when the host device and the USB device are connected to each other, one of the authentication of the USB device by the first authentication unit and the authentication of the host device by the second authentication unit is performed,
wherein, in parallel with the authentication of one of the USB device and the host device, authentication of the USB cable is also performed,
the host device or the USB device that has performed the authentications supplies power established in the power delivery communication to one of the host device and the USB device that has been authenticated, and
wherein when one of the authentications fails, the device that performed the authentications supplies a predetermined power supply voltage to the other device.

7. The power feeding system of claim 6, wherein the predetermined power supply voltage is 5V at 500 mA current.

8. A power feeding system comprising:
a USB cable comprising a first controller that holds a first security information; and
a host device and a USB device that are connected to each other via a setting line and perform a communication regarding a power supply via the setting line, wherein:
the USB device comprises a third controller that holds a second security information,
the host device comprises a second controller that receives the first security information from the first controller and authenticates the USB cable using the first security information, and receives the second security information from the third controller and authenticates the USB device using the second security information, the authentication of the USB cable and the USB device being performed in parallel,
when the USB cable and the USB device have been successfully authenticated by the host device, one of the host device and the USB device that has been recognized as a source-side device by the communication feeds power to a sink-side device via the USB cable based on a voltage selection signal from the other one of the host device and the USB device that has been recognized as the sink-side device, and
when the authentication of the USB cable or the authentication of the USB device fails, the source-side device supplies a predetermined power supply voltage to the sink-side device.

9. The power feeding system according to claim 8, wherein the first controller is connected to the setting line and transmits the first security information to the host device via the setting line.

10. The power feeding system according to claim 8, wherein the host device and the USB device are connected to each other by a power supply line different from the setting line, and one of the host device and the USB device that has been recognized as the source-side device outputs a voltage based on the voltage selection signal to the other one of the host device and the USB device that has been recognized as the sink-side device via the power supply line.

11. The power feeding system of claim 8, wherein the predetermined power supply voltage is 5V at 500 mA current.

* * * * *